United States Patent Office 2,890,619
Patented June 16, 1959

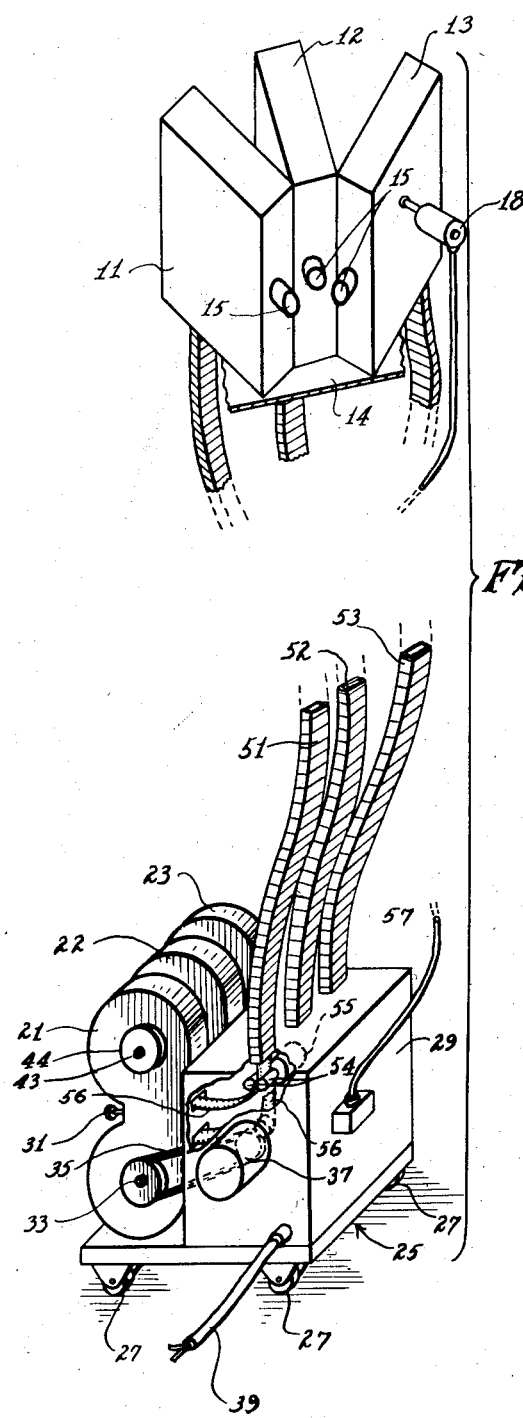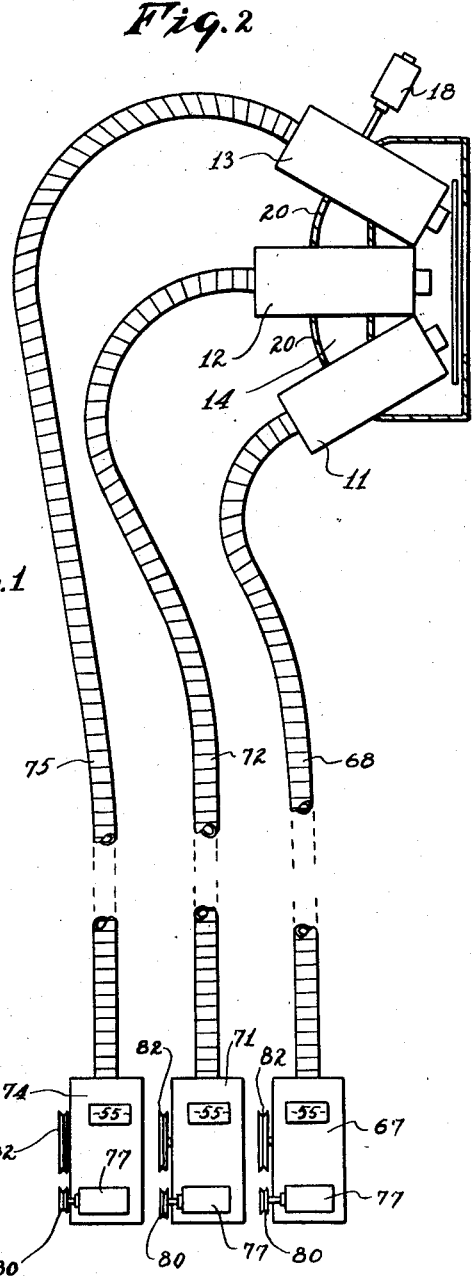

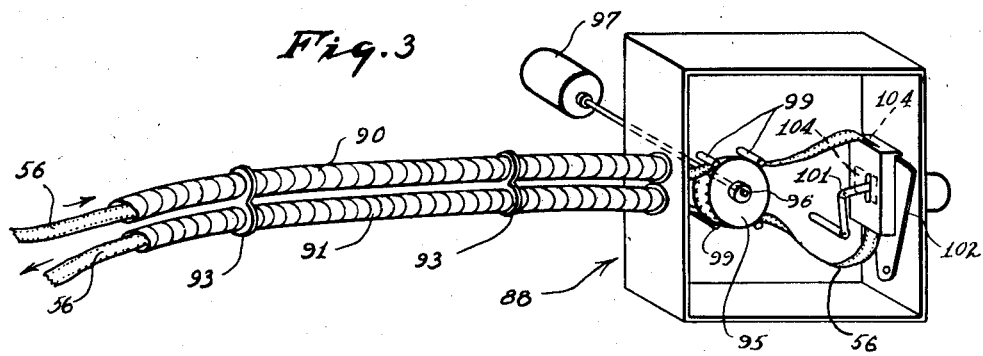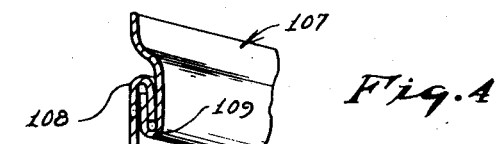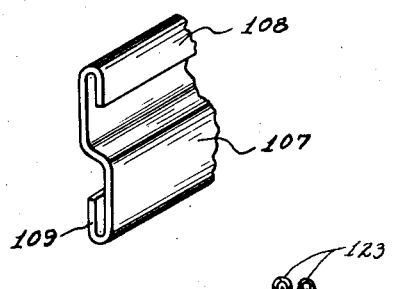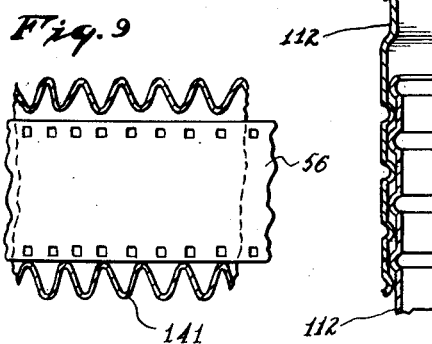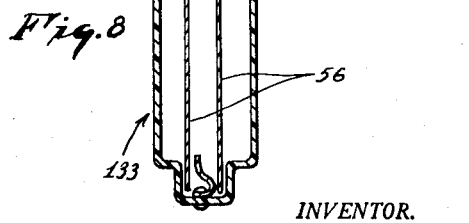

2,890,619

MOTION PICTURE CAMERA APPARATUS WITH FILM SUPPLY UNIT SEPARATE FROM FILM EXPOSURE UNIT

Fred Waller, deceased, late of Huntington, N.Y., by Doris Waller, executrix, Huntington, N.Y., assignor to Vitarama Corporation, Huntington, N.Y., a corporation of New York Application October 5, 1954, Serial No. 460,492

4 Claims. (Cl. 88—16.6)

This invention relates to motion picture cameras and particularly to constructions in which the camera is separate from the film magazines.

In many motion picture applications it is desirable to have a light camera which is capable of a certain amount of free movement, and that is light enough to carry. Heavy film loads and heavy mechanism such as drive motors, magazines and sound-proofing blimps make such freedom or lightness impossible in many cases. Furthermore, heavy duty mechanism and motors contribute largely to the ambient sound level which is particularly troublesome on close-ups where the camera, actor and microphone are extremely close to one another.

It is an object of this invention to provide an improved motion picture camera in which the camera proper includes only the essential structure necessary for taking the pictures; and the film magazine is located at some distance from the camera and provided with one or more flexible tubes through which the film is supplied to and withdrawn from the camera.

The invention is particularly advantageous in the case of cameras for taking mosaic pictures. In such cameras, a plurality of pictures are taken at the same time but on different films, and with the lenses directed at different angles so that the fields covered by the pictures taken through the different lenses combine to produce a single mosaic picture.

In making mosaic pictures, it is essential that the cameras be in a definite and fixed relationship to one another and this makes it necessary that all of them be connected to form a single multi-camera assembly, with the cameras operating at the same speed. The weight of such a multi-camera assembly or "head" is increased by the duplication of camera parts; and this invention is especially useful with such cameras because it provides a portability not otherwise obtainable.

Although the invention will be described in connection with a multi-camera head, it will be understood that it can also be applied to single camera heads in order to provide greater portability.

Some features of the invention relate to the combination of the camera head and film magazine assemblies with specific flexible tube connections; and some of the sub-combination claims relate to constructions of the flexible tube guides through which the films travel.

Other objects, features and advantages of the invention will appear or be pointed out as the description proceeds.

In the drawing, forming a part hereof, in which like reference characters indicate corresponding parts in all the views:

Figure 1 is a diagrammatic perspective view showing a multi-camera head connected with film magazines on a dolly with flexible tubes connecting the camera head and the film magazines on the dolly;

Figure 2 is a diagrammatic plan view showing a modified form of the invention;

Figure 3 is a diagrammatic view, partly broken away, showing another modified form of the invention for supplying film to, and removing it from, a single camera head;

Figure 4 is a greatly enlarged, fragmentary, sectional view showing one construction by which the flexible tubes may be made;

Figure 5 is a fragmentary perspective view showing the shape of the formed strip from which the tube in Figure 4 is made;

Figure 6 is a view similar to Figure 4, but on a reduced scale, showing another modified form of flexible tube used for connecting the camera head with the film magazine;

Figure 7 is a sectional view through another form of flexible tube;

Figure 8 is a sectional view, similar to Figure 7, but showing a modification of the construction illustrated in Figure 7; and Figure 9 is a longitudinal, sectional view through still another form of flexible tube for connecting the camera head with the film magazines.

Figure 1 shows a film exposing unit consisting of three camera heads 11, 12 and 13, mounted on a common base plate 14. Each of these camera heads has a lens 15 which can be focused in accordance with the distance of the object to be photographed. Each of the cameras 11, 12 and 13 contains a film gate, a shutter, and pull-down mechanism for bringing successive film frames into position at the gate in synchronized operation with the shutter. This motion picture camera mechanism is conventional and no illustration of it is necessary in Figure 1 for a full understanding of this invention.

The mechanism within the camera 13 is operated by an electric motor 18 having a shaft which extends through one side of the housing of the camera 13. The operating mechanism within the other cameras 11 and 12 is preferably connected with that of the camera 13 by flexible shafts 20 which do not show in Figure 1, but are the same as those illustrated in the modified form of the invention disclosed in Figure 2.

The films for the cameras 11, 12 and 13 (Figure 1) are contained in film magazines 21, 22 and 23, respectively. These film magazines are carried on a dolly 25 equipped with wheels 27. The magazines 21, 22 and 23 are connected to the back of a housing 29 which is fixed to the frame of the dolly 25. Each of the magazines 21, 22 and 23 is detachably connected to the housing 29 by means of a screw 31, or other detachable fastening means. The magazines 21, 22 and 23, the dolly 25, and the housing 29 constitute a portable magazine unit.

There is a shaft 33 in the lower portion of the magazine 21, and this shaft is secured to the take-up reel within the magazine 21. The shaft 33 is driven by a belt 35 from an electric motor 37 mounted on the fixed housing 29. Power is supplied to the housing 29 and the motor 37 through an electric cord 39. The belt 35 provides a friction drive for the shaft 33 and this drive slips after the torque supplied to the shaft 33 reaches a certain value. Thus the take-up reel within the magazine 21 runs when there is any slack in the film, but it does not determine the speed at which the film comes to the magazine 21. There is a similar drive for the take-up reels in the lower portions of the other film magazines 22 and 23.

The film magazine 21 has a shaft 43 at its upper portion for holding a film supply reel in the magazine 21. This shaft 43 is shown with a pulley 44 so that it can be driven by the belt 35, but it is not driven when the upper portion of the magazine is being used for the supply reel. The advantage of having pulleys on both the shaft 33 and the shaft 43 is that either the lower or upper portion of the magazine can be used for the take-up or the supply reel.

Film from the magazine 21 passes through the housing 29 of the magazine unit and then upwardly through a flexible tube 51 to the camera 11. After passing through the camera 11, the film travels back downwardly through the flexible tube 51 and through the housing 29 to the take-up reel on the shaft 33 of the film magazine 21. Film from the magazine 22 is similarly supplied through a flexible tube 52 to the camera 12 and then back through the same flexible tube to the take-up reel in the magazine 22; and the magazine 23 is connected with the camera 13 through a flexible tube 53 similar to the connections of the other film magazines to their cameras.

Within the housing 29 there are preferably rolls 54 driven by a torque motor 55. The film from the magazine 21 is designated by the reference character 56 in Figure 1; and this film is shown passing between feed rolls 54. There are similar feed rolls for each of the films from the magazines 22 and 23, and the rolls for each film are driven by a separate torque motor 55. Each motor is adjusted to compensate the pull required to unwind the supply reels, but does not have enough power to do anything more than to leave the films loose in the tubes 51, 52 and 53, or at least in the lower portions of these tubes.

The separate cameras 11, 12 and 13 are connected to the common plate 14 so as to maintain them in the proper angular relation to one another. This plate 14 is merely representative of means for supporting all of the cameras for movement as a unit, though in actual practice, it is desirable to have the separate cameras angularly adjustable on the plate with respect to one another for the purpose of correcting parallax errors which result from changes in the focus of the cameras.

Because of the fact that the cameras 11, 12 and 13 are separated from the heavy film magazines and the film feeding mechanism associated with these magazines; the multi-camera head assembly consisting of the cameras 11, 12 and 13, and their common base plate 14 can be moved easily for following motion and it can be pushed up near to the face of an actor for close-up work. Also, the multi-camera assembly shown in Figure 1 is light enough for the photographer to wear it strapped to his body by a suitable harness which makes the camera head more convenient to carry.

The distance that the camera head can be moved, without moving the film magazines, depends upon the length and flexibility of the tubes 51, 52 and 53. This length may be fifty feet or more. In practice, the photographer can have an assistant who moves the dolly 25, if it is necessary for the cameraman to take the camera head to different locations too far for the tubes to reach. In Figure 1, the flexible tubes 51, 52 and 53 are led into the cameras 11, 12 and 13 through the bottom of each of the cameras.

Figure 2 shows a modified construction in which the cameras 11, 12 and 13 are connected to the common plate 14 and have their pull-down and shutter mechanism driven from a common electric motor 18 through flexible shafting 20 which connects the operating mechanism of the camera 13 to the camera 12, and that of the camera 12 to the camera 11. The operating mechanism of the camera 13 is driven directly from the motor 18. In Figure 2 the cameras 11, 12 and 13 have a common rotary blade shutter located at the crossover point of the axes of the lenses of the cameras and driven through gearing, from the motor 18, in timed relation with the film pull downs.

The camera 11 in Figure 2 is connected to a film magazine 67 through a flexible tube 68 which is similar to the flexible tube 51, of Figure 1, except that the tube 68 is of round cross section instead of having the generally rectangular cross section shown in Figure 1. Also, the flexible tube 68 is shown connecting with the housing of the camera 11 through the back of the housing, instead of through the bottom, as in Figure 1.

The camera 12 in Figure 2 is connected with a magazine 71 through a flexible tube 72; and the camera 13 is similarly connected with a film magazine 74 through a flexible tube 75. In the construction shown in Figure 2, the film magazines 67, 71 and 74 are separate and are provided with separate motors 77 for driving the take-up reel of each magazine through a belt 79 which transmits motion from a pulley 80, on the armature shaft of the motor 77, to a pulley 82 on the shaft of the take-up reel of the film magazine. This friction drive provided by the belt 79 and pulleys 80 and 82 is similar to the drive provided by the belt 35 in Figure 1, and it slips when the take-up reel has taken the slack out of the film returning to the film magazine.

Figure 2 shows torque motors 84 which drive feed rolls similar to the feed rolls 54 of Figure 1 for keeping the films loose in the tubes 68, 72 and 75.

Figures 3 shows another modified form of the invention in which the film is supplied to the camera through one flexible tube and brought back to the film magazine through another flexible tube. In the drawing, the film is designated by the reference character 56, and the film travels toward a camera head 88 through a flexible tube 90 connected to the rearward wall of the housing of the camera head. The film 56 comes from the camera head 88 through another flexible tube 91 and it passes through this tube back to the film magazine.

The tubes 90 and 91 are connected together by flexible connectors 93, which may be made of rubber or loops of metal linked together, and the function of the flexible connectors 93 is to join the flexible tubes 90 and 91 loosely so that they remain generally parallel to one another at all times, but they can move as necessary to permit flexing of the tubes. There are preferably a number of flexible connectors 93 at spaced locations along the length of the tubes 90 and 91.

Within the housing of the camera head 88 there is a sprocket 95 secured to a drive shaft 96 which is rotated by a motor 97 at a controlled speed. This sprocket 95 has teeth which mesh with the sprocket openings of the film 56 and the upper portion of the sprocket 95 feeds the film 56 to the camera head 88, while the lower portion of the sprocket 95 meshes with the sprocket openings to advance the film 56 from the camera head 88 and into the flexible tube 91.

This sprocket 95 is an 'isolation" sprocket in that it isolates the operating mechanism within the camera head 88 from any other film driving means at other locations along the film, and makes the intermittent film feed in the camera head 88 independent of friction and other variables which may affect the feeding of the film to the camera head 88 or the withdrawing of the film from the camera head after exposure.

There are guide rolls 99 at angularly spaced regions around the sprocket 95 for holding a length of the film 56 in contact with upper and lower arcs of the sprocket 95. The intermittent film feed mechanism of the camera head 88 is indicated generally by the reference character 101; and this film feed 101 operates in timed relation with a shutter 102 which is preferably an oscillating shutter, though merely representative of shutters for exposing successive film frames as they reach the film gate 104.

Various types of flexible tubes can be used for feeding the films to and from the camera heads. Figure 4 shows a portion of the side wall of the tube 68. This tube is made from a formed strip 107, the contour of which is best shown in Figure 5, wrapped in a helix with the folded-over edge 108 along one side of one convolution engaging in an oppositely folded-over edge 109 along the opposite side of the next adjacent convolution of the helix, as shown in Figure 4. The tubing is formed by wrapping on a mandrel and the edges are brought into engagement by suitable guides as the strip is wrapped.

Figure 6 shows a modified construction for the flexible tubes. In this construction a tube 110 is made up of a plurality of relatively short sleeves 112. The upper portion of each of the sleeves 112 fits into the lower portion of the sleeve above it and there are outwardly extending corrugations 115 at spaced locations on the upper portion of each sleeve 112 located between inwardly extending corrugations 117 in the lower portion of each sleeve. These complementary corrugations prevent the sleeves from being disengaged with one another by axial movement, and there is a limited telescoping movement of the sleeves with respect to one another depending upon the distance between successive corrugations 117. Each of the corrugations 115 can move axially within the limits provided by the spacing of the corrugations 117 above and below each of the corrugations 115. This limited telescoping movement and the free fit of each ring 112 in the next succeeding ring permits some cocking of the rings and provides flexibility for the tube which is constructed of the successive rings 112, as shown in Figure 6.

Figure 7 shows a flexible tube 121 which is provided with parallel corrugations 123 extending lengthwise along one side of the tube and with an intervening corrugation 122 providing an element 122 between the grooves formed by the corrugations; and corresponding corrugations 125 at the opposite side of the tube. These corrugations, which open inwardly, provide grooves in which the edge portions of the films 56 slide. The grooves provided by these corrugations 123 and 125 are deep enough to receive the edge portions of the films which include the sprocket openings and they embrace enough of the width of each film to prevent it from arcing easily into contact with the other run of the film within the tube, even though the tube is flexed. However, the tube 121 is of a shape which flexes about axes of curvature which are for the most part parallel to the extent of the films 56 so that flexing of the tubes does not cause the film 56 to twist out of the guide grooves provided by the inwardly extending corrugations 123 and 125.

Figure 8 shows a tube construction which is similar to Figure 7 except that the grooves for the edges of the films 56 are obtained by connecting an element or parting strip 131 to the inside of a tube 133. This element or parting strip, which is preferably made of metal, is secured to the wall of the tube 133 by a rivet 135 which is merely representative of means for attaching the element or strip 121 to the inside of the tube 133. If the tube 133 is made of flexible plastic material, or other materials which are flexible but not conductors of electricity, then the metal parting strip 131 serves to ground the film and prevent the building up of charges of static electricity within the tube.

Figure 9 shows another modified construction for the tube. In this figure the film 56 passes through a tube 141 which is made of rubber and with a pleated wall such as used for bellows. This tube may be made of rubber or other material and can be reinforced with wire in the same manner as some vacuum cleaner hoses. The inner ends of the corrugations of the wall of the tube 141 serve as guide surfaces along which the edges of the film pass as the film 56 travels through the tube 141.

In Figure 9 the tube 141 is preferably of circular cross section and the film which passes through the tube is stiff enough to prevent the emulsion surfaces from dragging on the side of the tube even though the film does sag transversely into an arc. So long as the radius of curvature of the arc of the film is greater than the radius of curvature of the wall of the tube 141 only the edges of the film will rub along the surfaces of the inner ends of the corrugations of the tube wall shown in Figure 9.

The preferred embodiments of the invention have been illustrated and described, but changes and modifications can be made, and some features can be used in different combinations without departing from the invention as defined in the claims.

What is claimed is:

1. Motion picture camera apparatus for taking mosaic pictures, including in combination a film exposing unit having a plurality of camera heads secured in fixed relation to one another and each of which comprises a lens system, a film gate, and film advancing mechanism, the mechanisms of the different camera heads being coordinated for taking motion pictures at the same time, and the camera heads being angularly related to photograph adjacent areas of a large field for making images for a mosaic picture, a separate magazine for holding a film supply reel and a film take-up reel for supplying film to and receiving film from each film advancing mechanism of the film exposing unit, said magazines being adapted for mounting adjacent to one another, a separate tube connecting with each magazine and with a different one of the camera heads of the film exposing unit, each tube having longitudinal guide means therein extending for the full length of the tube for guiding and spacing two runs of film passing in opposite directions through the tube, the tubes being spaced from one another and each connected with a different one of the camera heads, and said tubes being flexible and constituting the only connection between the film exposing unit and the magazines whereby bending of the tubes gives the film exposing unit universal movement including changes in angular position with respect to and independently of the magazines within the limits of the lengths of the flexible tubes while photographing with said camera heads, guide means through which film passes from each magazine, and in unexposed condition, to the flexible tube for that magazine and to the corresponding camera head, and other guide means through which the film then passes from the tube through the camera head and its film advancing mechanism and back to its flexible tube and from the flexible tube to a take-up reel in the magazine for that film, the flexible tubes being movable independently of one another and into courses of different curvature from one another with changes in the angular position of the film exposing unit but the course, length and tension of both the outgoing and incoming runs of film of each magazine being maintained substantially the same by containment of said runs in the same tube.

2. The motion picture camera described in claim 1 and in which each magazine includes a take-up reel and a supply reel and there is a take-up reel drive for each magazine and also a film feed drive for each magazine including a torque motor of at least sufficient torque to supply loose film to at least the portion of the flexible tube nearest to the magazine.

3. The motion picture camera apparatus described in claim 1 and in which there is a carriage for extending the mobility of the film exposing unit beyond the lengths of the tubes, said carriage having wheels supporting it and facilitating its movement from place to place, the magazines being all mounted on the carriage and the tubes being held in fixed relation to one another at the ends of the tubes nearest to the magazines.

4. Motion picture camera apparatus including a film exposing unit, and a film magazine unit, which is separate from the film exposing unit so that the film exposing unit is movable independently of the film magazine unit, a flexible tube connecting the film exposing unit and the magazine unit and through which film travels from the magazine unit to the film exposing unit and back again, the tube being of greater width than height and its width being approximately equal to that of the film, elements within the flexible tube for separating the edges of the two runs of film passing through the tube, and film feeding mechanism for advancing one run of film toward the film exposing unit and the other run of film toward the magazine unit, the flexible tube being constructed of flexible material which is a non-conductor of electricity, and the element within the flexible tube being made of metal for conducting electricity to a ground connection to prevent the building up of a static charge on the film as it passes through the flexible tube.

(References on following page)

References Cited in the file of this patent

UNITED STATES PATENTS

| | | |
|---|---|---|
| 1,399,208 | Grabhorn | Dec. 6, 1921 |
| 1,657,795 | Guerin | Jan. 31, 1928 |
| 1,912,427 | Bodan et al. | June 6, 1933 |
| 1,966,092 | Fried | July 10, 1934 |
| 2,211,416 | Goldsmith | Aug. 13, 1940 |

FOREIGN PATENTS

| | | |
|---|---|---|
| 271,565 | Italy | Feb. 12, 1930 |
| 526,644 | Germany | June 8, 1931 |
| 390,791 | Great Britain | July 6, 1931 |